(12) United States Patent
Barthel et al.

(10) Patent No.: US 10,666,124 B2
(45) Date of Patent: May 26, 2020

(54) LINEAR STEPPER MOTOR AND VALVE UTILIZING THE SAME

(71) Applicant: Johnson Electric S.A., Murten (CH)

(72) Inventors: Daniel Gerhard Barthel, Kiel (DE); Sten Währisch, Dresden (DE); Gerd Howack, Kreischa (DE)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 143 days.

(21) Appl. No.: 15/871,567

(22) Filed: Jan. 15, 2018

(65) Prior Publication Data
US 2018/0226872 A1 Aug. 9, 2018

(30) Foreign Application Priority Data

Feb. 9, 2017 (DE) .......... 10 2017 102 628
Feb. 9, 2017 (DE) .......... 10 2017 102 631

(51) Int. Cl.
H02K 7/08 (2006.01)
H02K 41/03 (2006.01)
F16K 31/04 (2006.01)
F16K 31/08 (2006.01)
H02K 7/06 (2006.01)
(Continued)

(52) U.S. Cl.
CPC .......... *H02K 41/031* (2013.01); *F16C 3/023* (2013.01); *F16C 41/004* (2013.01); *F16K 31/047* (2013.01); *F16K 31/08* (2013.01); *H02K 5/15* (2013.01); *H02K 7/06* (2013.01); *H02K 7/083* (2013.01); *H02K 7/085* (2013.01); *H02K 7/086* (2013.01); *F16C 2322/39* (2013.01); *H02K 5/225* (2013.01); *H02K 15/03* (2013.01)

(58) Field of Classification Search
CPC .......... H02K 41/03; H02K 15/03; H02K 7/08; H02K 5/15; H02K 7/083; H02K 7/086; H02K 41/031; H02K 7/085; H02K 7/06; H02K 5/225; F16K 31/04; F16K 31/08; F16K 31/047; F16C 2322/39; F16C 41/004; F16C 3/023
See application file for complete search history.

(56) References Cited

U.S. PATENT DOCUMENTS 7,095,148 B2 * 8/2006 Mayumi .............. H02K 5/1672
310/49.01

FOREIGN PATENT DOCUMENTS

| EP | 1 496 600 A2 | 1/2005 | |
| EP | 1496600 A2 * | 1/2005 | .............. H02K 7/06 |
| JP | 63001337 A * | 1/1988 | |

OTHER PUBLICATIONS

EPO machine translation of EP-1496600-A2, all pages, Jan. 2005 (Year: 2005).*

* cited by examiner

*Primary Examiner* — Naishadh N Desai
(74) *Attorney, Agent, or Firm* — Muncy, Geissler, Olds & Lowe, P.C.

(57) ABSTRACT

A linear stepper motor with an actuating rod in a housing with a stator, a rotor and a replaceable bearing shield fixed on the stator is provided. The rotor includes a threaded shaft. The bearing shield defines two guide cut-outs. The actuating rod includes a spindle nut portion engaged with the threaded shaft, a replaceable coupling shank for a customer-specific actuating element, and two opposing parallel fork legs which link the spindle nut portion and the coupling shank and which are guided in a rotation-locked manner through the two guide cut-outs.

18 Claims, 15 Drawing Sheets

(51) Int. Cl.
  *F16C 3/02* (2006.01)
  *H02K 5/15* (2006.01)
  *F16C 41/00* (2006.01)
  *H02K 15/03* (2006.01)
  *H02K 5/22* (2006.01)

LINEAR STEPPER MOTOR AND VALVE UTILIZING THE SAME

CROSS REFERENCE TO RELATED APPLICATIONS

This non-provisional patent application claims priorities under 35 U.S.C. § 119(a) from Patent Application No. 102017102628.2 filed in Germany on Feb. 9, 2017, and Patent Application No. 102017102631.2 filed in Germany on Feb. 9, 2017, the entire contents of which are hereby incorporated by reference.

FIELD OF THE INVENTION

This invention relates to a linear stepper motor, especially a linear stepper motor having a displaceable actuating rod with a replaceable coupling shank and a valve utilizing the same.

BACKGROUND OF THE INVENTION

A common linear stepper motor includes an actuating rod. The actuating rod has a coupling shank which is used to force an external object, such as valve of a gas meter. However, the actuating rod and the coupling shank is hard to be replaced by new actuating rod and new coupling shank for the common linear stepper motor.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
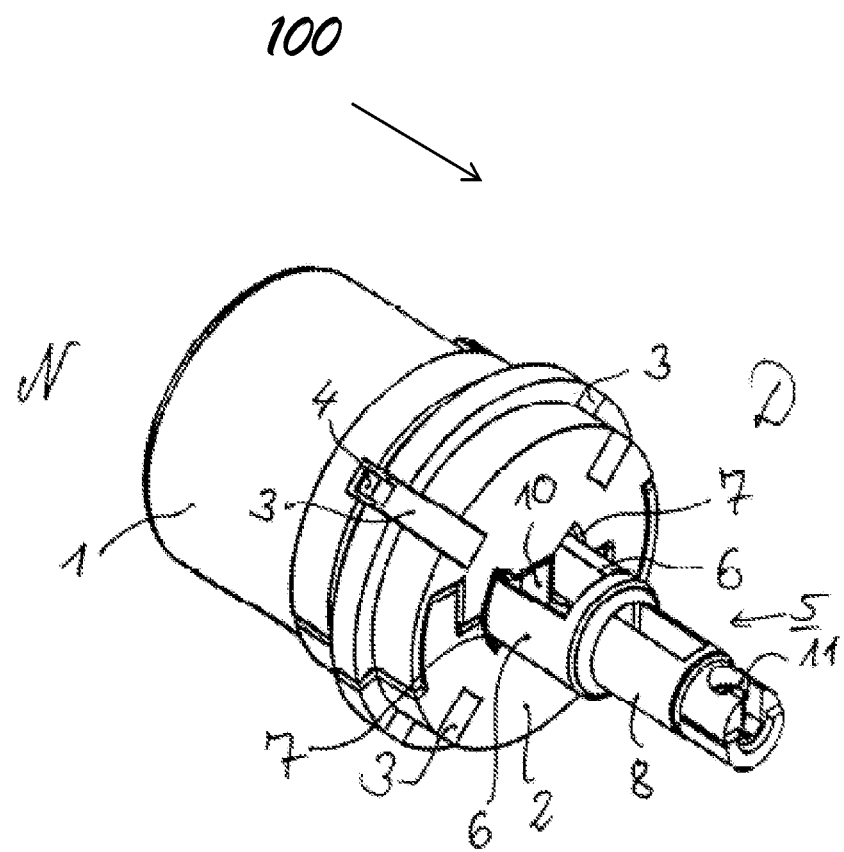
FIG. 1 shows a linear stepper motor with a two-piece D-side bearing shield in perspective view.

FIG. 1 depicts a linear stepper motor 100 with a stator 1, a bearing shield 2 closing the D-side of the motor, a rotor 102 disposed within the stator 1, and an actuating rod 5, which with its two parallel fork legs 6 is fitted through two guide cut-outs 7 in the bearing shield 2 conforming to the contours of the web cross-sections. At the outer headpiece, the parallel fork legs 6 end in a coupling shank 8, which for example is formed with the contours 11 for remote actuation of a water valve. In one embodiment, the actuating rod 5 may be a one-piece rod, in another embodiment, the actuating rod 5 may be constructed by two pieces or more than two pieces. The bearing shield 2 includes a number of moulded slots 3, each of which includes a connecting clip 4. the bearing shield 2 is fastened without screws onto the stator 1 by the connecting clip 4. In one embodiment, the number of the slots 3 is four.

Figure 2:
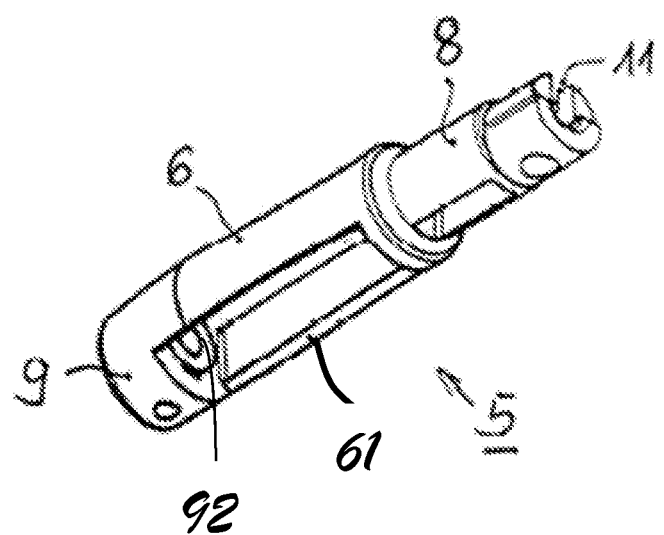
FIG. 2 shows a perspective view of an actuating rod.

FIG. 2 shows the actuating rod 5 as a one-piece component in perspective view. The actuating rod 5 can be manufactured in an injection moulding process from a plastic material. The two parallel, diametrically moulded fork legs 6 connect the D-side coupling shank 8 with a spindle nut section 9 on the inner N-side end of the actuating rod 5. Consequently, both fork legs 6 are constructed as being closed on both ends.

The spindle nut portion 9 is part of a spindle-nut drive, not depicted in more detail, in the interior of the motor, which provides for a linear movement being carried out by the actuating rod 5 when running the motor along a threaded shaft 103, whereby both the fork legs 6 in conjunction with the two guide cut-outs 7 in the bearing shield 2 make sure that the actuating rod 5 does not rotate. Furthermore, the guide cut-outs 7 serve for the straight-line motion of the actuating rod 5. On the other hand, the fork legs 6 make an axial interior space for the threaded shaft, which on one side is mounted in a bearing seat of the N-side bearing shield and on the other side mounted with no play in an interior bearing seat of an integrally moulded bearing bridge 10 of the D-side bearing shield 2. In the example the cylindrical coupling shank 8 is of user-specific design and exhibits contours 11, here configured as a slot with a hole in a graduated end piece of the coupling shank 8.

Figure 3A:
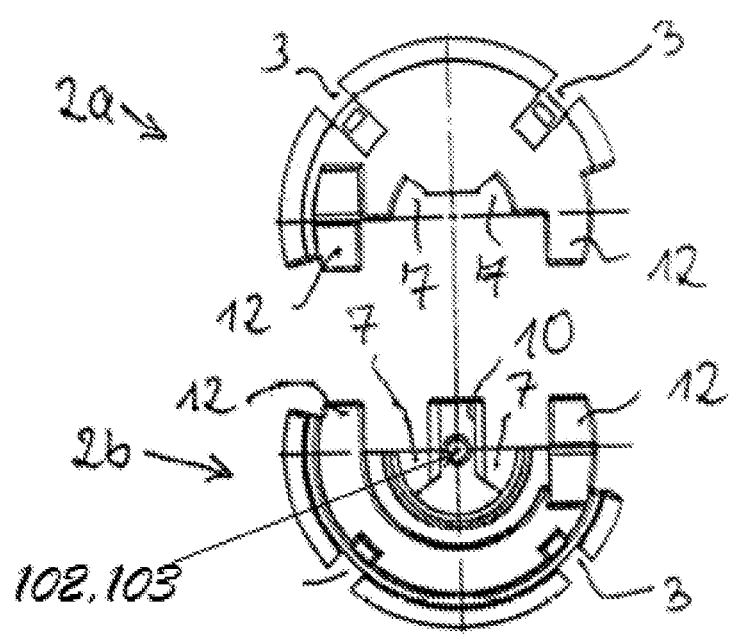
FIG. 3a shows a top view of two complementary bearing shield segments with an integrally moulded bearing.
Figure 3B:
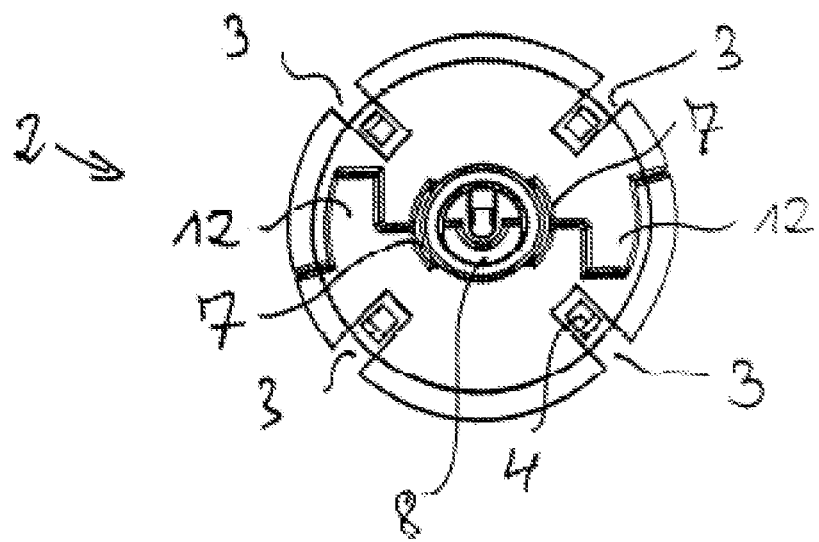
FIG. 3b shows a view of the face (D-side) of a complete assembled linear stepper motor with the bearing shield put together.

FIGS. 3a and 3b depict a first variant of a divided bearing shield 2. The bearing shield 2 is formed of two segments 2a, 2b of semi-circular shape, which when put together make up a complete bearing shield 2. Both segments 2a, 2b can be manufactured from a plastic material. Each bearing shield segment has plug and latch tongues 12 and moulded slots 3 for connecting clips 4 to the stator 1. Furthermore, contours are moulded on the inside for centre placing onto the circular cross-section stator housing 1. As is seen specifically in FIG. 3a, segment 2a, which is shown from its exterior, is formed slightly recessed from the centre of the bearing shield 2. This recess, in conjunction with the analogous recess in the bearing shield segment 2b and its bearing bridge 10, produces the guide cut-outs 7 for insertion of the connection fork legs 6 of the actuating rod 5. Of the complementing bearing shield segment 2b, the reverse side is visible together with the integrally moulded bearing bridge 10 of the bearing shield segment 2b for seating the threaded shaft. Otherwise the bearing shield segment 2b is indistinguishable from a bearing shield segment 2a. It should be noted that the two bearing shield segments 2a, 2b need not be necessarily executed as symmetrical or semi-circular. It is only essential that both bearing shield segments 2a, 2b permit being joined complementarily into a complete bearing shield 2.

FIG. 3b discloses a view of the drive side (D-side) of a complete assembled linear stepper motor. Two symmetrical bearing shield halves 2a, 2b combine to become the bearing shield 2 and snap together with their plug and latch tongues 12. By means of four connecting clips 4 within the moulded slots 3, the completed bearing shield 2 is fixed onto the stator 1. The centre of the bearing shield 2 is obscured by the top view of the coupling shank 8 of the actuating rod 5, however the two guide cut-outs 7 of a circle segment shape in bearing shield 2 are visible, through which the fork legs 6 of a circle segment cross section of the actuating rod 5 are pushed.

Figure 4:
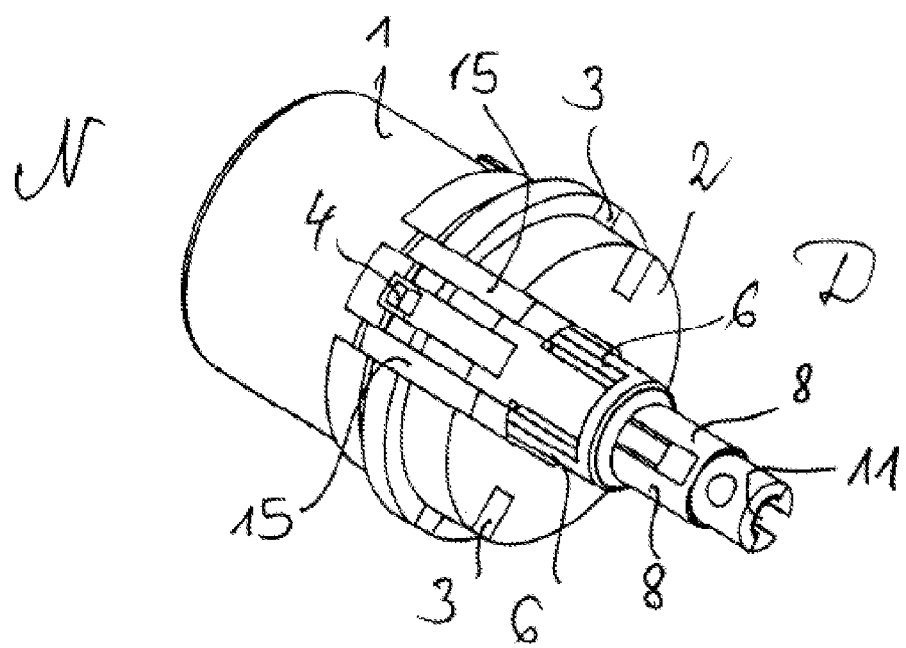
FIG. 4 shows a linear stepper motor with a one-piece, slotted bearing shield in perspective view.
Figure 5:
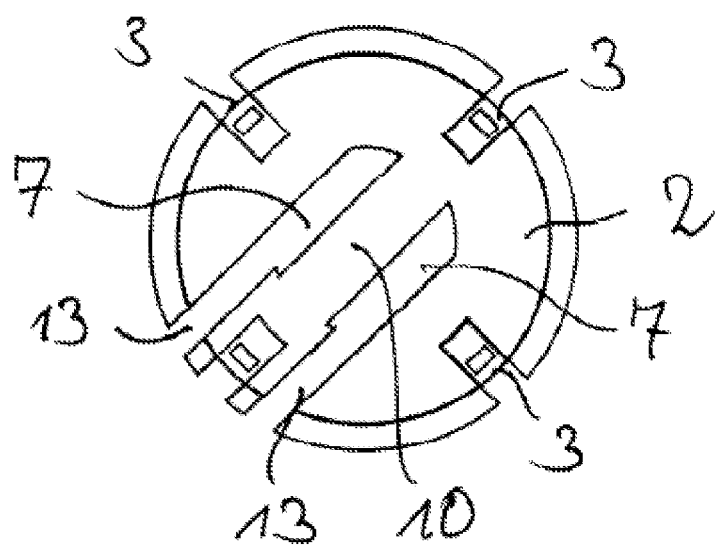
FIG. 5 shows a one-piece, slotted bearing shield as an individual component.
Figure 6:
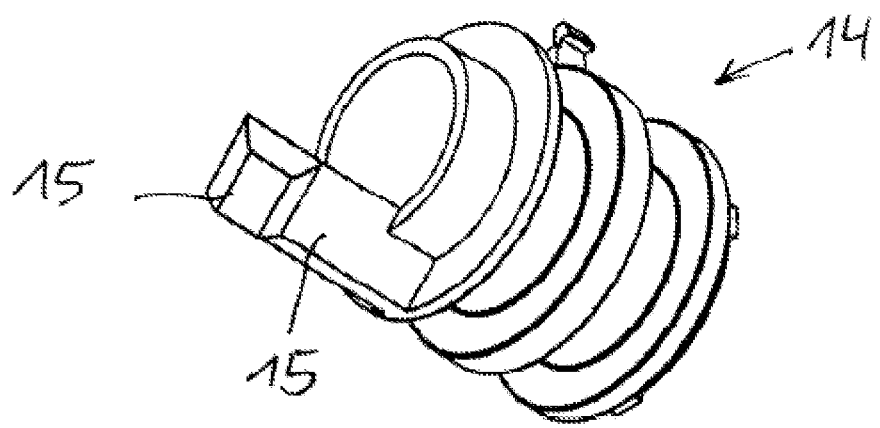
FIG. 6 shows a perspective view of a stator with its stator projections.

A further embodiment of the inventive concept shall be described in more detail by means of FIGS. 4 to 6. First FIG. 4 represents a perspective overall view of a linear stepper motor whose construction is similar in all important details to that previously described with the exception of the bearing shield 2. A bearing shield 2 is fixed without screws to the stator housing 1 with connecting clips 4. The bearing shield 2 is in turn passed through by the two fork legs 6 of the actuating rod 5. As is illustrated specifically in FIG. 4, which shows the bearing shield from its exterior, the bearing shield 2 is in one piece in this implementation. However, in order to be able to pass the actuating rod 5 through in the region of its fork legs 6, both guide cut-outs 7 have open slots 13 towards the rim, permitting the actuating rod 5 to be pushed in there from the rim. With the help of two stator projections 15 provided on the stator 1 (the stator winding is not illustrated), as shown in more detail in FIGS. 4 and 6, the slots 13 are closed by the stator projections 15 when the motor is put together, leaving only the guide cut-outs 7 open for the actuating rod 5. Between the two guide cut-outs 7 the bearing bridge 10 is formed, which is furnished on the inner side with a D-side bearing seat for the threaded shaft.

Figure 7:
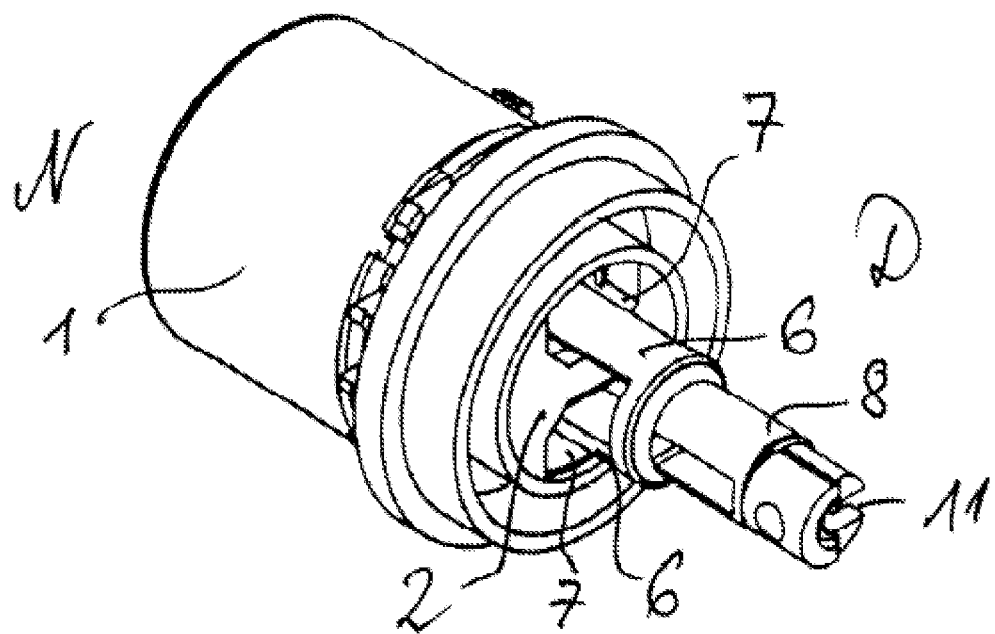
FIG. 7 shows a linear stepper motor with pass-through bearing shield in perspective view.
Figure 8A:
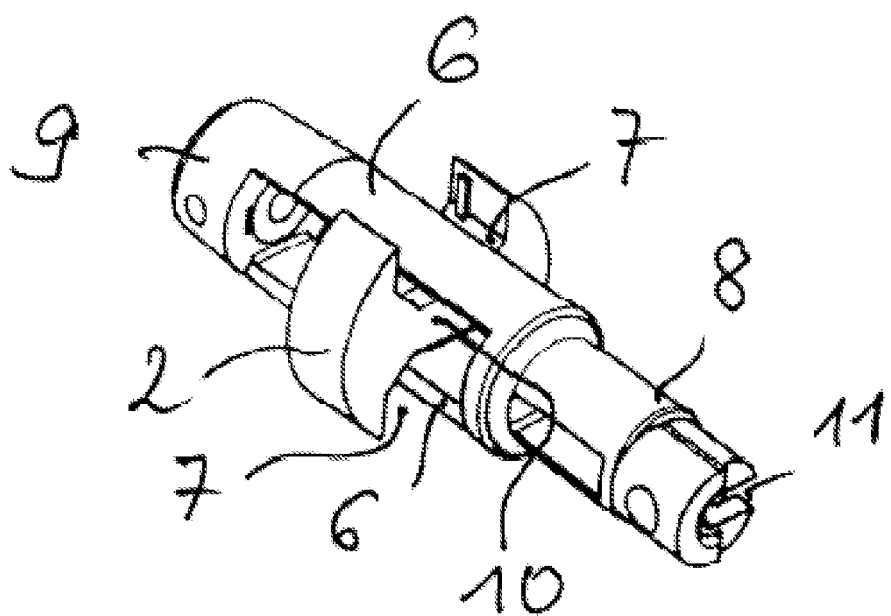
FIG. 8a shows an actuating rod with the bearing shield passed through in perspective view.
Figure 8B:
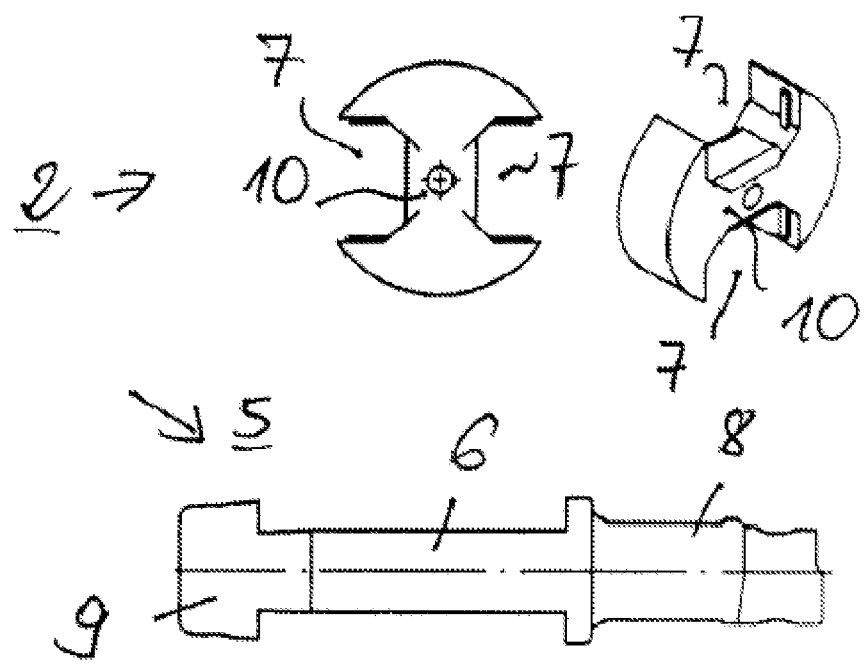
FIG. 8b shows the bearing shield and the actuating rod in individual diagrams.

FIGS. 7 to 8b disclose a third embodiment of the invention. A design-adapted linear motor is shown in perspective view by FIG. 7. In this variant, the bearing shield 2, preferably a plastic disc with corresponding edge cut-outs 7 to accommodate the fork legs 6 of the actuating rod 5 is inserted in the stator 1 on its D-side and rotation-locked by adhesives, laser- or US-welding. The bearing shield 2 can on the other hand be regarded as a circular disc, in which the guide cut-outs for the fork legs 6 of the actuating rod 5 are arranged diametrically. The middle part thus constricted forms a bearing bridge 10 with a central bearing seat for the threaded shaft. The thickness of the bearing shield 2, the measurement of the guide cut-outs 7, the cross-section of the fork legs 6 and the width of the clearance between these are adapted to one another such that in a pre-assembly process the bearing shield 2 can first be inserted longitudinally through the clearance between the fork legs 6 of the actuating rod 5 and finally be placed transversely. In FIG. 8a this pre-assembly process is depicted, while in FIG. 8b the bearing shield 2 and actuating rod 5 are represented separately.

Figure 9:
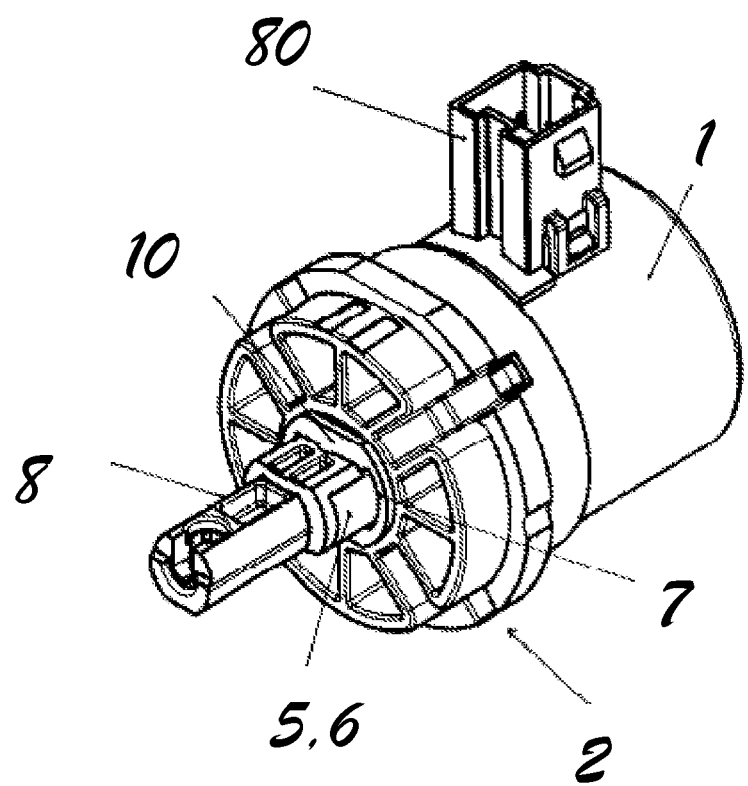
FIG. 9 shows a perspective view of the linear stepper motor in another embodiment.

As refer to FIG. 9, the linear stepper motor includes a bell-shaped permanent magnet rotor whose threaded shaft has a spindle-type male thread which is axially adjusted by a threaded drive with a mating female thread that forms the spindle nut portion 9 of the actuating rod 5. In one embodiment, the actuating rod 5 is forked shaped. The actuating rod 5 extends radially lengthwise to the threaded shaft and receives the threaded shaft between its fork legs 6. The leg ends of the fork legs 6 are fitted through the drive bearing shield 2, which ends with a specially formed bearing bridge 10 provided with respective guide cut-outs 7 for the actuating rod 5. On the one side, at the spindle nut portion not visible here, the actuating rod 5 is thus supported and guided on the threaded shaft with its threaded drive and, on the other side, it is supported and guided through the guide cut-outs 7 in the bearing bridge 6. On the outer end of the actuating rod 5 with its fork legs 6, the coupling shank 8 of optionally different design depending on requirements is plugged on in a manner to be detailed, for instance, for a motorized actuation of a control valve of a heating boiler. On its circumference the housing of the stator 1 has an electrical socket connector 80 for the controlled energization of the linear stepper motor in both senses of rotation as required.

Figure 10:
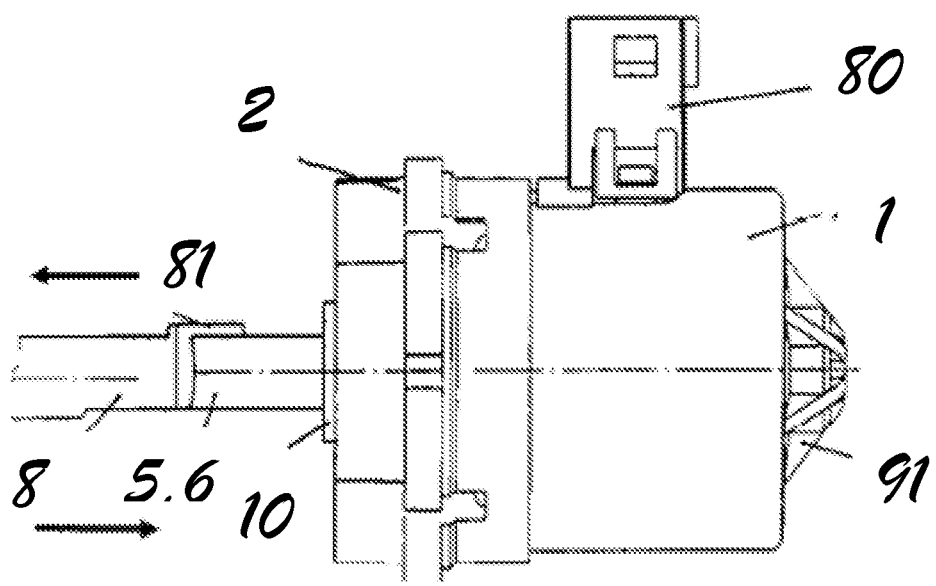
FIG. 10 shows a side view of the linear stepper motor of FIG. 9.

As refer to FIG. 10, the reference numbers introduced in the former also used consistently for this figure and FIG. 10 also shows the non-drive bearing shield 91 for the rotor and its threaded shaft. The actuating rod 5 actuates a function element not shown in detail both in the push direction and in the pull direction.

Figure 11:
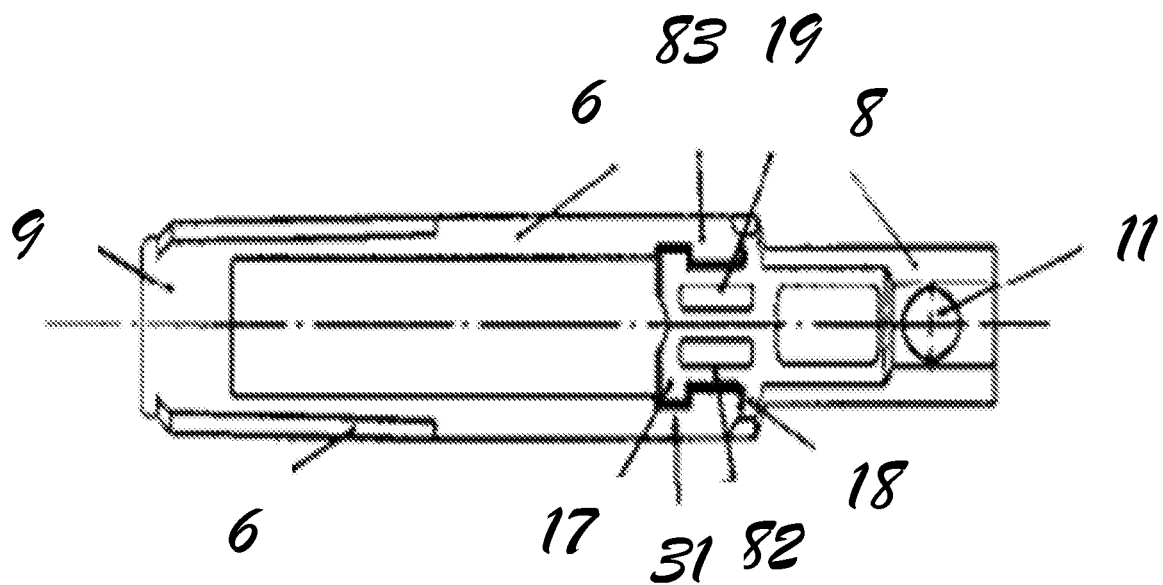
FIG. 11 shows a complete actuating rod with fork leg and coupling shank in a top view.

FIG. 11 shows a top view drawing of the complete actuating rod 5 including the plugged-on coupling shank 8 of optionally different design depending on requirements in a second embodiment. The example describes the actuating rod 5 having only two fork legs 6 which receive the threaded shaft between them. However, more than two fork legs 6 may be provided. The elongated thin-walled parallel fork legs 6 facing each other are joined with each other on the motor side by a spindle nut portion 9 which has a threaded drive (FIG. 12) with a female thread 101 mateable with the threaded shaft. At each outer open end of the fork legs 6, there is a hook-shaped contour 83 pointing radially inwards and shaped by respective recesses 31 in the fork legs 6. Likewise, the hook-shaped contours 83 may point radially outwards. Additionally, the front faces 41 of the fork legs 6 are inclined at an obtuse angle. The short, closed coupling shank 8 is fittingly and radially pushed onto this structure up to its stop 81 by applying a certain pressure. The direction of plugging is fundamental for this present disclosure as on the one hand, the fork legs 6 fitted through the guide cut-outs 7 in the bearing bridge 10 do not allow resilient backing away radially in an axial plug-on operation, and on the other hand, axially plugged-on elements often have unwanted play. Also in radial plug-on direction, the contours 11 such as a coupling point in the coupling shank 8 for a function element is claimed, such as e.g. a valve rod of a control valve, so that there is no cause for inadvertent loosening of the coupling shank 8 from the fork legs 6 when coupling the function element.

The mating contour 84 of the connecting projection of the coupling shank 8 exactly matches the hook-shaped contour 83 of the fork legs 6 so that play-free plugging of the compact coupling shank 8 onto the fork ends is ensured in a dovetail press fit. A projecting outside contour 17 at the front face of the coupling shank 8 fits in the recess 31 of the fork legs 6 and another slanted locating ring 18 of the coupling shank 8 contacts the beveled front ends 41 of the fork legs 6 in a precisely fitting manner.

The contact region for tensile forces is designed to be vertical to the direction of force. In order to prevent the fork legs 6 from either being bent open or coming loose inadvertently, the fork is held radially with its slopes 41/18.

Additionally, the connecting projection of the coupling shank 8 is provided with recesses 19 such as to form elastically deformable zones 82 in the area of the hook-shaped contour 83 at the fork legs 6, achieving a sufficient latching force.

The mechanical preload in the dovetail press fit is designed and dimensioned such that tensile forces act on the coupling shank 8 and thrust forces act on the fork legs 6. This is advantageous insofar as plastic materials are known to endure thrust forces better than tensile forces and thus the placement of the tensile forces into the coupling shank 8 has advantages in terms of stability due to its larger cross-section. The actual pressure force arises between the projecting outside contour 17 on the front face of the coupling shank 8 and the slanted locating ring 18 of the coupling shank 8 against the hook-shaped contour 83 of the fork legs 6.

Figure 12:
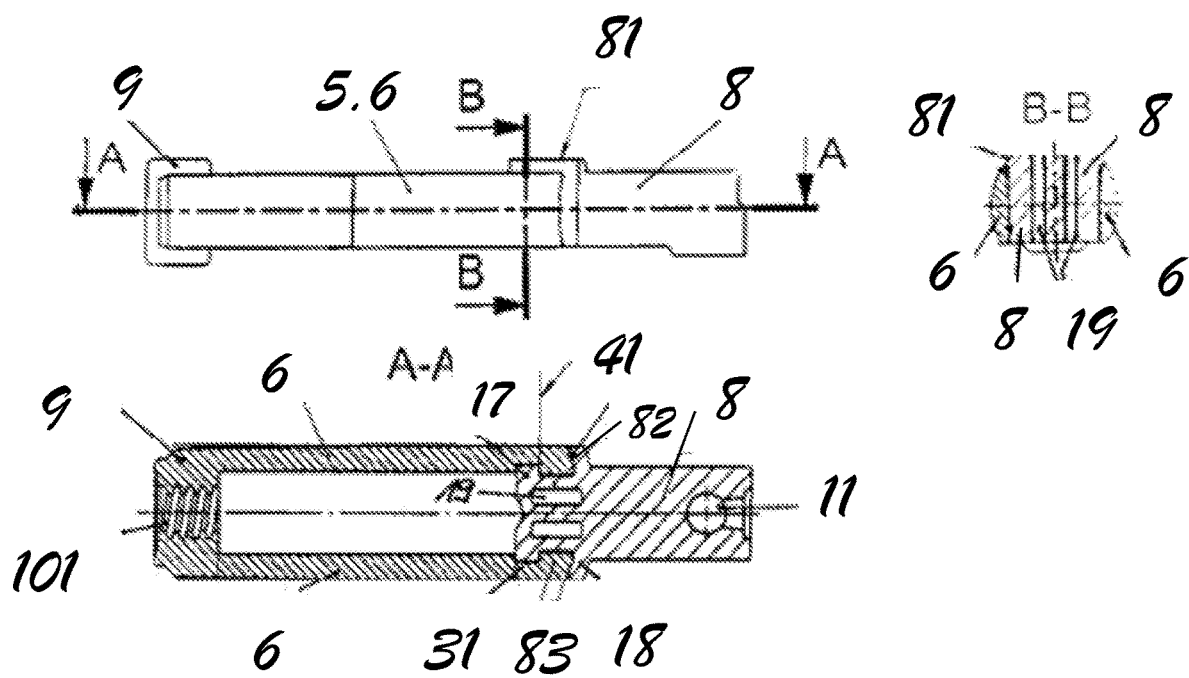
FIG. 12 shows the complete actuator rod of FIG. 11 in a side view as well as in the sectional views A-A and B-B.

FIG. 12 shows the complete actuating rod 5 with its coupling shank 8 once again in a side view and in two sectional views A-A and B-B. The side view and the sectional view B-B show the already mentioned stop 81 which limits the radial plug-on path of the coupling shank 8 on the fork legs 6. In addition, sectional view B-B shows once again how the coupling shank 8 is tightly pressed into the fork legs 6, its inner recesses 19 providing for the necessary elasticity of the coupling shank 8 in the area of the hook-shaped contour 83. Furthermore, sectional view A-A specifically shows the female thread 101 at the spindle nut portion 9 of the actuating rod 5, on which the threaded shaft runs in a rotation-locked manner. The female thread 101 can be formed in the spindle nut portion 9 that joins the fork legs 6 at the root or a separate threaded piece with female thread 101 is inserted into the spindle nut portion 9.

What is also easy to recognize is the dovetail press fit between the fork legs 6 and the coupling shank 8 which is achieved when both parts are plugged on radially without tools and which provides for absolutely firm seating.

The complete actuating rod 5 consisting of the fork legs 6, the spindle nut portion 9 and the coupling shank 8 is advantageously made of an impact-resistant, flexurally rigid injection moulded plastic material. Endurance tests have shown that the dovetail press fit according to the invention between the fork legs 6, the spindle nut portion 9 and the coupling shank 8 is very stable also in long-term operation under a load of tensile and thrust forces of about 100 N and more and easily reaches the required service life.

Figure 13:
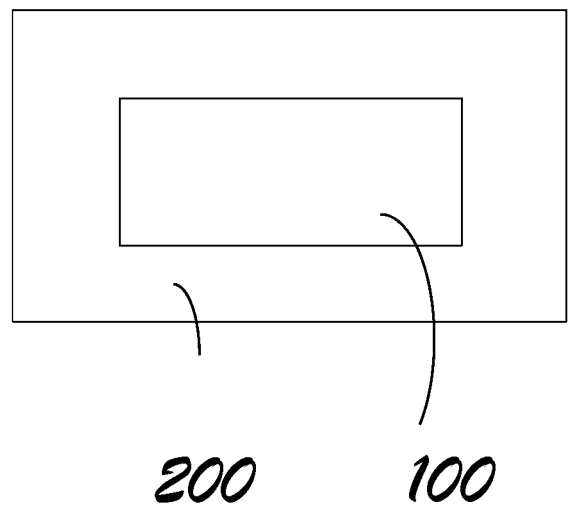
FIG. 13 shows a valve with the linear stepper motor.

Refer to FIG. 13, a valve 200 is provided. The valve 200 includes the above linear stepper motor 100. The valve 200 is an actuation valve or a water valve of heating device, such as heating boiler, etc.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. A linear stepper motor comprising a stator including a housing, an actuating rod disposed in the housing, a rotor and a bearing shield fixed on the stator, the rotor comprising a threaded shaft, the bearing shield defining two guide cut-outs, the actuating rod comprising a spindle nut portion engaged with the threaded shaft, a coupling shank for a customer-specific actuating element, and two opposing parallel fork legs which link the spindle nut portion and the coupling shank and which are guided in a rotation-locked manner through the two guide cut-outs, wherein the bearing shield is placed inside the clearance between the two fork legs of the actuating rod;

wherein the bearing shield is put together of two complementary bearing shield segments, between which, in the joined state, two self-contained guide cut-outs are formed to accommodate the fork legs of the actuating rod as well as a bearing bridge forming a bearing seat for the threaded shaft.

2. The linear stepper motor of claim 1, wherein the bearing shield comprises two bearing shield segments of semi-circular shape, each with two partial cut-outs open towards the radius, which, in the joined state of the bearing shield segments, build up into two enclosed guide cut-outs to accommodate the fork legs of the actuating rod.

3. The linear stepper motor of claim 1, wherein the bearing bridge is integrally moulded with the bearing shield segment.

4. The linear stepper motor of claim 1, wherein the bearing shield segments, in the joined state, lock together by means of plug or latch tongues.

5. A linear stepper motor comprising a stator including a housing, an actuating rod disposed in the housing, a rotor and a bearing shield fixed on the stator, the rotor comprising a threaded shaft, the bearing shield defining two guide cut-outs, the actuating rod comprising a spindle nut portion engaged with the threaded shaft, a coupling shank for a customer-specific actuating element, and two opposing parallel fork legs which link the spindle nut portion and the coupling shank and which are guided in a rotation-locked manner through the two guide cut-outs;

wherein the bearing shield is placed inside the clearance between the two fork legs of the actuating rod;

wherein the bearing shield is constructed in a single piece and the two guide cut-outs to accommodate the fork legs of the actuating rod are open towards the rim through two parallel slots, wherein a bearing bridge forms a bearing seat for the threaded shaft between the two guide cut-outs.

6. The linear stepper motor of claim 5, wherein in an assembled state of the bearing shield, the two slots are closed by two stator projections of stator.

7. The linear stepper motor of claim 5, wherein the bearing shield is formed in a single piece and has two diametrically arranged guide cut-outs opening directly on the rim to accommodate the fork legs of the actuating rod, the bearing bridge for a bearing seat of the threaded shaft is formed between the two guide cut-outs, and the bearing shield is inserted in the clearance between the fork legs of the actuating rod.

8. The linear stepper motor of claim 7, wherein the bearing shield is fixed in an inner ring of the stator in a rotation-locked manner.

9. A linear stepper motor with an actuating rod in a housing with a stator, a rotor and a bearing shield fixed on the stator, the rotor comprising a threaded shaft, the bearing shield defining two guide cut-outs, the actuating rod comprising a spindle nut portion engaged with the threaded shaft, a coupling shank for a customer-specific actuating element, and two opposing parallel fork legs which link the spindle nut portion and the coupling shank and which are guided in a rotation-locked manner through the two guide cut-outs, wherein the actuating rod forms radially oriented hook-shaped contours with its open ends at the fork legs, the coupling shank is radially pluggable with its mating contours enclosing the hook-shaped contours in a manner of a dovetail press fit.

10. The linear stepper motor of claim 9, wherein the coupling shank has a stop limiting the radial plug-on path.

11. The linear stepper motor of claim 9, wherein the coupling shank has elastically deformable zones in the area of the hook-shaped contours of the fork legs.

12. The linear stepper motor of claim 11, wherein the elastically deformable zones are formed by corresponding recesses in the coupling shank.

13. The linear stepper motor of claim 11, wherein permanent mechanical preloading acts in the fork legs by means of contour slopes in contact elastically deformable zones between the fork legs and the coupling shank in the area of the hook-shaped contours.

14. The linear stepper motor of claim 9, wherein the actuating rod has more than two fork legs.

15. The linear stepper motor of claim 9, wherein a contour for a function element in the coupling shank is defined.

16. The linear stepper motor of claim 9, wherein a female thread is formed in a spindle nut portion that joins the fork legs at the root.

17. The linear stepper motor of claim 9, wherein the actuating rod is made of a flexurally rigid injection moulded plastic material.

18. A valve comprising a linear stepper motor, wherein the linear stepper motor comprises an actuating rod, a stator, a rotor and a replaceable bearing shield fixed on the stator, the rotor comprises a threaded shaft, the bearing shield defines two guide cut-outs, the actuating rod comprises a spindle nut portion engaged with the threaded shaft, a replaceable coupling shank for a customer-specific actuating element, and two opposing parallel fork legs which link the spindle nut portion and the coupling shank and which are guided in a rotation-locked manner through the two guide cut-outs;

wherein the bearing shield is placed inside the clearance between the two fork legs of the actuating rod;

wherein the bearing shield is put together of two complementary bearing shield segments, between which, in the joined state, two self-contained guide cut-outs are formed to accommodate the fork legs of the actuating rod as well as a bearing bridge forming a bearing seat for the threaded shaft.

* * * * *